United States Patent [19]

Stone

[11] 4,289,506
[45] Sep. 15, 1981

[54] SCRUBBING APPARATUS

[76] Inventor: Arthur F. Stone, Marine View Plaza #1, Hoboken, N.J. 07030

[21] Appl. No.: 148,041

[22] Filed: May 8, 1980

[51] Int. Cl.³ ............................................. B01D 47/08
[52] U.S. Cl. ........................................ 55/92; 55/230; 55/260; 261/84; 261/118
[58] Field of Search ...................... 55/91, 92, 230, 238, 55/240, 260; 261/84, 89, 90, 115, 118

[56] References Cited

U.S. PATENT DOCUMENTS

| | | | |
|---|---|---|---|
| 1,005,819 | 10/1911 | Ensign | 261/90 |
| 2,801,084 | 7/1957 | Krupp et al. | 261/84 X |
| 2,941,872 | 6/1960 | Pilo et al. | 55/230 X |
| 3,073,095 | 1/1963 | Hungate | 55/230 |
| 3,168,596 | 2/1965 | Jamison | 55/230 X |
| 3,478,496 | 11/1969 | Keough | 261/89 X |
| 3,538,685 | 11/1970 | Bremen | 55/230 |
| 3,596,885 | 8/1971 | Stone | 261/84 |
| 4,157,249 | 6/1979 | Namy | 261/89 X |

Primary Examiner—William A. Cuchlinski, Jr.
Attorney, Agent, or Firm—Lerner, David, Littenberg & Samuel

[57] ABSTRACT

Methods and apparatus for scrubbing a gas with a scrubbing fluid are disclosed. The apparatus disclosed includes a rotatable scrubbing fluid impeller rotatable about an axis of rotation and a scrubbing fluid supply conduit to supply scrubbing fluid to an inner portion of the impeller so that upon rapid rotation of the impeller about the axis the scrubbing fluid is impelled outwardly and forms a rapidly rotating scrubbing fluid curtain of discrete jets at the outer periphery thereof. In one embodiment, the rotatable impeller includes first and second axially displaced sections, the first section for impelling the scrubbing fluid outwardly and the second section for impelling the gas outwardly to and through diffuser vanes, and then to vanes for altering the direction of flow of the gas as it passes from the diffuser exit plenum so that it is forced through the rapidly rotating scrubbing fluid curtain in a direction opposite to that of the rotation of the scrubbing fluid. In another embodiment, the rotatable impeller includes an annular scrubbing fluid distribution surface including a plurality of discrete scrubbing fluid jet forming elements located at the periphery thereof. Methods for performing all of these steps are also disclosed.

78 Claims, 20 Drawing Figures

SCRUBBING APPARATUS

FIELD OF THE INVENTION

The present invention is directed to methods and apparatus for scrubbing a gas with a scrubbing fluid. More particularly, the present invention is directed to such methods and apparatus including a rotatable impeller for forming a rapidly rotating curtain of discrete jets of scrubbing fluid at the outer periphery of a rotating impeller, and for forcing the gas to be scrubbed through that curtain.

BACKGROUND OF THE INVENTION

While various types of devices have been known for many years for effecting the removal of particulate matter from gases for various purposes, a significant advance in this art is represented by U.S. Pat. No. 3,596,885, which issued on Aug. 3, 1971. This patent discloses such a device which includes a rotatable impeller (wheel 21) which is used to establish a rapidly rotating curtain of scrubbing fluid at the outer periphery thereof. Furthermore, this curtain is then utilized to scrub a gas which is directed against that curtain at an acute angle to a plane normal to the axis thereof and opposed to the direction of rotation of the curtain of scrubbing fluid. In U.S. Pat. No. 3,596,885 this is accomplished by directing the gas from inlet 20 into an annular passage between inner and outer housings 10 and 11, where the rapidly rotating curtain of scrubbing fluid is located, and by directing the gas stream in the required manner by means of web 28, as shown in FIG. 3 thereof.

The apparatus and method disclosed in U.S. Pat. No. 3,596,885 has proven to be extremely valuable from a commercial standpoint. However, the search has continued for improvements in such a system, and the present application discloses a number of improvements which are applicable thereto.

Firstly, in connection with the concept of combining in a single apparatus means for impelling both a gas and a liquid, U.S. Pat. No. 3,478,496 to Keough discloses an impeller 40 located at the top of an exhaust stack 10 within enclosure 20. The fan redirects the gas from the stack outwardly within enclosure 20. In addition, however, part of the fan 40 defined by space 68 serves to produce a water jacket within the enclosure 20 as shown. However, contact with gas of any kind does not occur until the water jacket has cascaded downwardly under the force of gravity, and even then there is no passage of the gas through a rapidly rotating curtain of fluid, such as in the manner disclosed in the aforementioned U.S. Pat. No. 3,596,885. Also, U.S. Pat. No. 2,590,342 to Niehaus et al discloses an air washer including an impeller fan which rotates at high speed to atomize a stream of washing liquid so as to produce a fog of tiny liquid particles and force the gas through that fog. In particular, the patentee employs a fan 23 rotating at high speed to atomize washing liquid flowing through perforations 32 and conduit 29 so that the liquid and gas are simultaneously forced outwardly by fan 23. Again, there is no attempt to pass the gas stream to be scrubbed through a rapidly rotating curtain of scrubbing fluid.

British Pat. No. 681,609 to Jennings discloses yet another apparatus of this type, in this case for removing fine dust from blast furnace gas. This patentee employs a turbine-like apparatus including a series of discs 11 for rotation at high speed. Thus, water from feed distributor 19 is carried through holes drilled in collars 13 separating the discs 11 and emerges on the surface of each of the flat discs and spins outwardly therefrom to generate a dense curtain of water for contact with the gas passing therethrough. Again, no apparatus incorporating both a gas and scrubbing liquid impeller for forcing both gas and liquid outwardly is disclosed therein.

As for the nature of the scrubbing fluid impeller means itself, various references in a number of fields teach means for creating sprays of liquid and the like. Thus, U.S. Pat. No. 2,850,232 to Ingram discloses a centrifugal sprayhead, in this case for receiving paint, lacquer or other liquids, and to effect uniform distribution around the rotor thereof. In this case atomized particles are said to be produced by means of a sprayhead which includes a rotor body 6 having a central hub 7 so that liquid can be delivered to the hub bore 8. Thus liquid enters aperture 31 from bore 8 and finally through a series of apertures 36, strikes flange 41 so as to engage generally flat, annular surface 43, the outer periphery of which is bounded by wall 46 and finally to the rotor surface 48 including a plurality of grooves or slots extending over the conical surface thereof. Reference is also made to U.S. Pat. No. 3,765,688 to Junker, which relates to a fluid seal, but which does include a U-shaped channel member 12 and an annular baffle 18 projecting thereinto, further wherein oil delivered from nozzles 23 into channel member 12 can escape through bleed holes 24.

Additional patents relating to gas seals produced by liquids so as to confine a gas stream include, aside from the Junker patent, U.S. Pat. No. 3,694,042 to Rabenhorst, which discloses a liquid sealed in a radial fluid bearing, in this case including an annular member 34 positioned within a rotating annular flange 22 which retains fluid 14 therein through the action of centrifugal force. In addition, U.S. Pat. No. 1,949,429 to McGee discloses another type of fluid seal arrangement.

SUMMARY OF THE INVENTION

In accordance with the present invention improved methods and apparatus for scrubbing a gas with a scrubbing fluid have now been discovered. In particular, these improvements, when incorporated into the apparatus and methods shown in U.S. Pat. No. 3,596,885, are capable of improving even the significant results obtainable with that apparatus and method.

In accordance with one aspect of the present invention, the apparatus for scrubbing a gas with a scrubbing fluid comprises rotatable impeller means having first and second axially displaced sections and an outer periphery, the axially displaced sections being rotatable about a common axis, scrubbing fluid supply means for supplying scrubbing fluid to the first section, gas supply means for supplying gas to the second section, so that upon rapid rotation of the impeller means about the common axis the liquid and gas are impelled outwardly from both sections, and the scrubbing fluid forms a rapidly rotating scrubbing fluid curtain of discrete jets at the outer periphery of the impeller means, and means for altering the direction of the gas as it flows rapidly outwardly from the impeller means so that the gas passes through the rapidly rotating scrubbing fluid curtain in a direction opposed to that of the rotation of the scrubbing fluid so as to scrub the gas with the scrubbing fluid. In accordance with one aspect of this apparatus, fixed diffuser vane means are provided at the outer periphery of the second section of the rotatable impeller means for substantially reducing the rotational component of the gas, and so as to increase its pressure while reducing its velocity. That is, as the gas is impelled outwardly from the rotatable impeller it will include a radial vector component and a rotational vector component, which combine to give it a resultant vector therebetween. The diffuser vane means preferably thus comprise a plurality of vanes, preferably having an arcuate configuration, and including a first or inlet end and a second or outlet end, with the inlet end being directed substantially coincident with the resultant vector of the flowing gas, and the outlet end being directed so as to impel the gas in a direction which is substantially radially directed, and which is now at an increased static pressure.

In accordance with another aspect of this embodiment of the apparatus of the present invention, the first section of the rotatable impeller includes an annular scrubbing fluid distribution surface defined by inner and outer annular surface portions radially displaced from the axis of rotation. In this embodiment the inner surface portion is substantially planar and the outer surface portion includes a plurality of discrete scrubbing fluid jet forming members for interrupting the substantially planar surface so as to channel the scrubbing fluid into discrete scrubbing fluid jets.

In accordance with a preferred embodiment of this aspect of the apparatus of the present invention, the first and second axially displaced sections of the rotable impeller are affixed to each other for rotation together about the common axis, preferably by both being affixed to a common rotatable wall.

In accordance with another embodiment of this aspect of the apparatus of the present invention, the gas supply means first passes through the first section of the rotatable impeller and the apparatus includes fluid seal means for providing a fluid seal between that gas supply means and the first section of the rotatable impeller, so as to prevent the gas from bypassing the second section of the rotatable impeller. In a preferred embodiment, the scrubbing fluid supply means includes a scrubbing fluid conduit located adjacent to the axis of rotation of the rotatable impeller, and the fluid seal means is also located adjacent to that axis of rotation, so that the scrubbing fluid conduit feeds scrubbing fluid to the fluid seal prior to supply of the fluid to the first section of the rotatable impeller, so that the scrubbing fluid can act as the fluid to establish the liquid seal. In this embodiment, the scrubbing fluid supply means is located radially inward from the fluid seal.

In a preferred embodiment, the fluid seal includes a generally axially extending wall extending from the annular scrubbing fluid distribution surface so that scrubbing fluid builds up against that wall as the fluid passes radially outward. Preferably this wall member has a substantially L-shaped cross-section, including an axially extending leg and an inwardly directed radially extending leg.

In accordance with one embodiment of this aspect of the apparatus of the present invention, a plurality of rotatable impellers are employed, preferably including first and second rotatable impellers which are axially displaced along a common axis of rotation. Preferably, both second sections of the first and second rotatable impellers are located adjacent to each other along that common axis, and in one embodiment they are affixed to each other for common rotation. In another embodiment, however, the second sections of the first and second rotatable impellers are spaced apart along the common axis, and common gas exit means are provided therebetween for removal of the gas after it has passed through the rapidly rotating scrubbing fluid curtains provided by both impellers.

In accordance with the method of the present invention a gas is supplied to a first location adjacent to the axis of rotation of a rotatable gas impeller and the method also includes supplying scrubbing fluid to a second location adjacent to the axis of rotation of a rotatable fluid impeller including an outer periphery, these axes of rotation comprising a common axis, and the first and second locations being axially displaced from each other along that common axis, thus causing the gas and the scrubbing fluid, respectively, to pass radially outward from the first and second sections in first and second axially displaced planes by rapidly rotating both rotatable impellers about their common axis to thereby form a rapidly rotating scrubbing fluid curtain at the outer periphery of the rotatable fluid impeller, and altering the direction of the gas as it flows radially outward from the rotatable gas impeller so that the gas is directed from the first plane to cross the second plane and be forced through the rapidly rotating scrubbing fluid curtain in a direction opposite to that of the fluid.

In accordance with one embodiment of this aspect of the method of the present invention, the direction of flow of the gas is altered as it flows radially outward from the gas impeller in a manner so as to substantially reduce the rotational component of the flow of gas caused by the rapid rotation of the gas impeller, and to increase the gas pressure while reducing its velocity, i.e. to serve as a gas diffuser. A preferred embodiment of this method of the present invention includes forming a substantially continuous sheet of scrubbing fluid at a first radial location in the second plane as the scrubbing fluid passes radially outward, and subsequently forming that substantially continuous sheet of scrubbing fluid into a plurality of discrete scrubbing fluid jets at a second radial location in the second plane, the second radial location being at the outer periphery of the rotatable scrubbing fluid impeller.

In another embodiment of this method, the gas is supplied to the first location by first passing the gas through the second location, and the method includes providing a fluid seal between the rotatable scrubbing fluid impeller and the gas passing through the second location so as to prevent the gas from bypassing the first location. Preferably, in this embodiment the scrubbing fluid passing radially outward from the second location is employed to provide that fluid seal. Preferably, this method includes centrifuging the liquid in order to collect or segregate any solids contained therein, and then bleeding a portion of this concentrated scrubbing fluid in order to remove these solids therefrom.

In accordance with another embodiment of the apparatus of the present invention, the apparatus includes a rotatable impeller mounted on an axis for rotation, and including an annular scrubbing fluid distribution surface including a plurality of discrete liquid jet forming means, scrubbing fluid supply means to supply scrubbing fluid to the inner surface of the annular scrubbing fluid distribution surface so as to form a substantially continuous sheet of fluid upon rapid rotation of the rotatable impeller, and whereby that substantially continuous sheet of fluid is formed into a plurality of discrete fluid jets upon contact with the plurality of discrete liquid jet forming means, to thus form a rapidly rotating scrubbing fluid curtain comprised of discrete scrubbing fluid jets at the outer periphery of the impeller means, and gas redirection means for directing the flowing gas to be scrubbed through that rotating curtain of scrubbing fluid in a direction opposed thereto in order to scrub the gas with the scrubbing fluid.

This aspect of the apparatus of the present invention incorporates several overall advantages therein. Thus, and as particularly compared to prior highly successful apparatus such as that of U.S. Pat. No. 3,596,885, this apparatus provides even greater energy savings, primarily because the scrubbing fluid can pass outwardly in an even more unimpeded and efficient manner. Furthermore, the fluid is capable of imparting a significant degree of kinetic energy to the gas, acting in a manner similar to that of a blower. Furthermore, it is possible to employ a scrubbing fluid herein which includes a relatively high degree of solids therein, or a slurry, in view of the relatively unobstructed flow of fluid therein.

In accordance with this embodiment of the apparatus of the present invention, the annular scrubbing fluid distribution surface can be substantially planar, or it can include a substantially conical portion, but in either event it is an open surface, as compared to closed tubes or other passageways. In a preferred embodiment, however, this surface includes inner and outer annular surface portions, with the outer portion including the plurality of jet forming means, and preferably with the inner portion being substantially flat and/or being substantially conical.

In accordance with another aspect of this embodiment of the apparatus of the present invention, the gas redirection means includes a plurality of fixed vanes located adjacent to the outer periphery of the rotatable impeller and positioned so as to redirect the gas into a direction opposed to the direction of flow of the rapidly rotating scrubbing fluid curtain.

In a preferred embodiment, the apparatus includes an outer housing, and an inner housing mounted concentrically within the inner housing so as to form an annular passage therebetween. The rotatable scrubbing fluid impeller is then located within the inner housing, which includes an annular aperture to permit the rapidly rotating scrubbing fluid curtain to pass freely therefrom, and into the annular passage between the inner and outer housings.

In accordance with a preferred embodiment of this method of the present invention, the scrubbing fluid is fed to a location adjacent to the axis of rotation of a rotatable impeller which includes an annular scrubbing fluid distribution surface, a substantially continuous sheet of scrubbing fluid is formed adjacent to the axis of rotation, a plurality of discrete liquid jets is formed so as to produce a rapidly rotating scrubbing fluid curtain at the outer periphery of the impeller means, and a gas which is to be scrubbed is forced through that rapidly rotating curtain so as to scrub the gas with the scrubbing fluid.

In accordance with one embodiment of this method of the present invention, the location adjacent to the axis of rotation is axially displaced below the annular scrubbing fluid distribution surface so that the scrubbing fluid must pass axially upward onto the annular scrubbing fluid distribution surface as it is projected radially outward from that location adjacent to the axis rotation.

In a preferred embodiment of this method of the present invention, the method includes supplying the gas to a location adjacent to the axis of rotation of a rotatable gas impeller, that axis of rotation being common to the axis of rotation of the rotatable scrubbing fluid impeller and thus projecting the gas radially outward upon the rapid rotation of the rotatable gas impeller.

In accordance with another aspect of the apparatus of the present invention, the apparatus comprises a rotatable impeller mounted on an axis of rotation, and including a fluid distribution hub adjacent to that axis, fluid distribution means for directing scrubbing fluid radially outward from the fluid distribution hub upon rapid rotation of the rotatable impeller, and an outer periphery, scrubbing fluid supply means for supplying scrubbing fluid to the fluid distribution hub so that upon rapid rotation of the rotatable impeller the scrubbing fluid forms a rapidly rotating curtain at the outer periphery of the impeller, the scrubbing fluid supply means including a scrubbing fluid conduit terminating a predetermined distance from the fluid distribution hub, and scrubbing fluid directing means mounted on the axis of rotation for directing the scrubbing fluid from the end of the scrubbing fluid conduit to the fluid distribution hub, the scrubbing fluid directing means being spaced from the end of the scrubbing fluid conduit so that the scrubbing fluid directing means is free to rotate with the rotatable impeller without interference from the scrubbing fluid conduit, while at the same time substantially all of the scrubbing fluid passes from the end of the scrubbing fluid conduit to the fluid distribution hub, and means for passing the gas to be scrubbed through the rapidly rotating curtain of scrubbing fluid at the periphery of the impeller so as to scrub the gas with the scrubbing fluid.

In accordance with a preferred embodiment of this aspect of the apparatus of this invention, the fluid distribution means comprises an annular scrubbing fluid distribution surface, which is preferably defined by inner and outer annular surface portions radially displaced from the axis, and including a plurality of discrete scrubbing fluid jet forming means for channelling the scrubbing fluid into discrete scrubbing fluid jets and to form a rapidly rotating scrubbing fluid curtain of discrete jets therefrom. Preferably, the annular scrubbing fluid distribution surface can be substantially planar, or it can include a substantially conical portion, and the discrete scrubbing fluid jet forming means are located at its periphery.

In a preferred embodiment, the scrubbing fluid distribution hub is axially displaced downwardly below the annular scrubbing fluid distribution surface so that the scrubbing fluid must pass axially upward onto the annular scrubbing fluid distribution surface as it is projected radially outward from the scrubbing fluid distribution hub. Preferably, the scrubbing fluid directing means comprises a cylindrical member coaxially disposed about the axis of rotation, or a truncated right circular conical section with the larger diameter placed adjacent to the rotatable impeller, and in the case of the cylindrical member, it includes an annular collar radially projecting inwardly from its end adjacent to the scrubbing fluid conduit, and terminating a predetermined distance therefrom.

BRIEF DESCRIPTION OF THE DRAWINGS

In the accompanying drawings.

DETAILED DESCRIPTION

Figure 1:
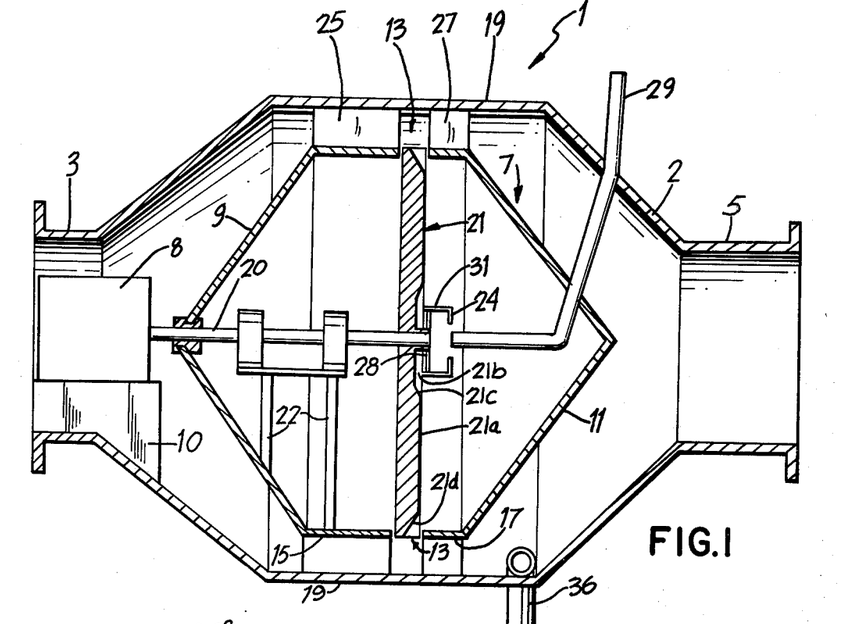
FIG. 1 is a side, sectional, elevational view of a scrubbing apparatus of the present invention.

Referring to the figures, in which like numerals refer to like portions thereof, FIG. 1 shows an overall gas scrubbing apparatus 1 of this invention, including a hollow outer housing 2 including an inlet end 3 and an outlet end 5. The hollow outer housing 2 is coaxial with an inner housing 7, which as shown has conical ends 9 and 11, thus forming an annular passageway between the inner and outer housings, 7 and 2, respectively. The two parts of the inner housing 7 thus provide an annular gap 13 therebetween. Furthermore, the cylindrical wall sections 15 and 17 forming that annular passageway with the outer housing 2, and which form the sides of annular gap 13, are themselves cylindrical, and are concentric with respect to the cylindrical midportion 19 of outer housing 2.

A rotatable impeller or wheel 21 is mounted in the plane of annular gap 13 between the two halves of inner housing 7, and coaxial and on a common axis with both the inner and outer housings, 7 and 2, respectively. The diameter of the rotatable impeller 21, is substantially equal to the outer diameter of the cylindrical portions 15 and 17. Shown diagrammatically in FIG. 1 is one possible method for rapidly rotating the rotatable impeller means 21, including a shaft 20, for turning the impeller, which in turn is driven by a motor 8, while supports 22 are shown for the shaft bearings, and support 10 is shown for the motor.

Located in the annular passage between the inner and outer housings 7 and 2 are fixed vanes or spaced webs 25 and 27. While these serve to support the inner housing 7 within the outer housing 2, the primary function of vanes 25 is to assure that the gas passing through the annular space between the inner and outer housings impinges upon a curtain of discrete jets of scrubbing fluid generated therein (as is discussed in more detail below) in a direction generally counter to the direction of travel of the rotating impeller. This phenomenon is discussed in U.S. Pat. No. 3,596,885, as is the fact that this increases the impaction thereof so as to achieve increased atomization and resultant entrapment of the particulate matter in the gas by the liquid. On the other hand, vanes 27 are intended to establish a distinct flow pattern for the gas as it is discharged from the housing. In any event, the general construction of these vanes 25 and 27 is shown in more detail in FIG. 3 of U.S. Pat. No. 3,596,885, which figure and description thereof is incorporated herein by reference thereto.

Figure 14:
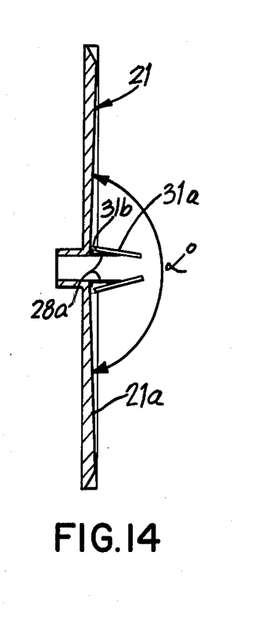
FIG. 14 is a side, sectional, elevational view of another embodiment of the impeller of the present invention.

Turning now to the configuration of the rotatable impeller 21 itself, which forms a significant element in the embodiment of the present invention shown in FIG. 1, the impeller 21 has a circular configuration and has a substantially open face, i.e., as compared to the individual pipes or tubes employed in U.S. Pat. No. 3,596,885. Impeller 21 can preferably be substantially planar, or it can include a substantially conical portion as is shown more clearly in FIG. 14. The upper face 21a of impeller 21 includes a central well portion 21b, which is surrounded by an annular sloping portion 21c, leading to the upper surface 21a thereof. The annular well portion 21b thus surrounds the central axis of rotation of the impeller. Water or other scrubbing fluid which is to be supplied to the impeller 21 is thus initially directed to well portion 21b so that it initially enters the center of the impeller 21 at a point below or depressed from the upper, preferably planar surface 21a. As is discussed in more detail below, this assists in retaining the fluid on the surface of the impeller 21. The upper portion of the impeller face 21a will preferably be substantially flat or planar, or again as shown in FIG. 14, can have a substantially conical face, e.g., one having an occluded angle α, generally between about 120° and 175°. Further, this inner portion of the impeller surface is preferably not interrupted by any projections, etc., which would interfere with the flow of scrubbing fluid, and/or which would prevent the formation of a substantially continuous sheet of fluid over that surface. At the outer periphery 21d of the impeller, however, there are located discrete liquid jet forming members 23, various types of which are shown in FIGS. 4–8. These members 23, are intended to convert the substantially continuous scrubbing fluid sheet on the surface of the impeller into a plurality of discrete liquid jets, which themselves then form a rapidly rotating scrubbing fluid curtain of discrete jets at the outer periphery of the impeller, i.e. within the space between the inner and outer housings 7 and 1. The members 23 themselves may be directed coincident with a radius 26 of the impeller 21, be disposed at an angle $\theta$ of between 0° and 60° with respect thereto, or in some cases may be disposed at an angle $\beta$ of between 0° and 15° with respect thereto, i.e., where $\theta$ is measured in the direction of rotation of the impeller as shown by the arrow in FIG. 2, and $\beta$ is measured counter to that direction of rotation. It is most preferred, however, for these elements 23 to be disposed at an angle $\theta$, and most preferably where $\theta$ is approximately 0°, i.e., where the elements are radial.

Figure 2:
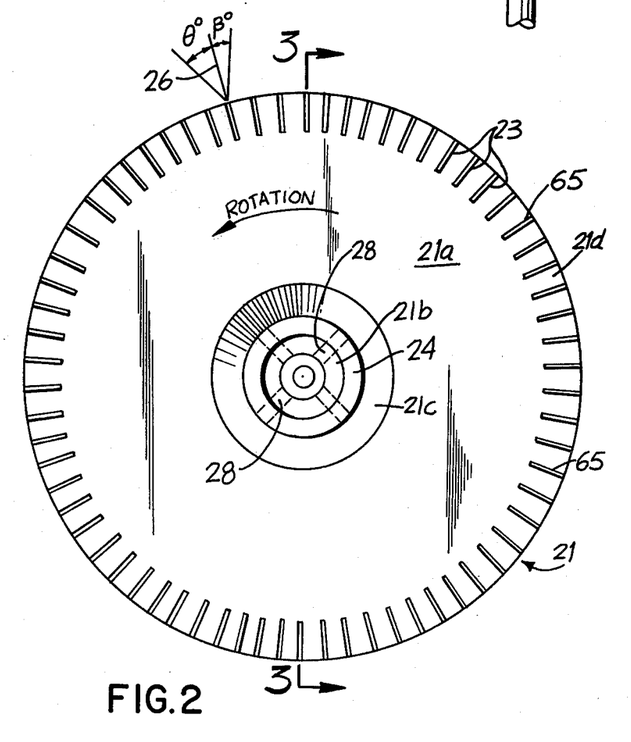
FIG. 2 is a front, elevational view of one embodiment of the rotatable impeller of the present invention.
Figure 3:
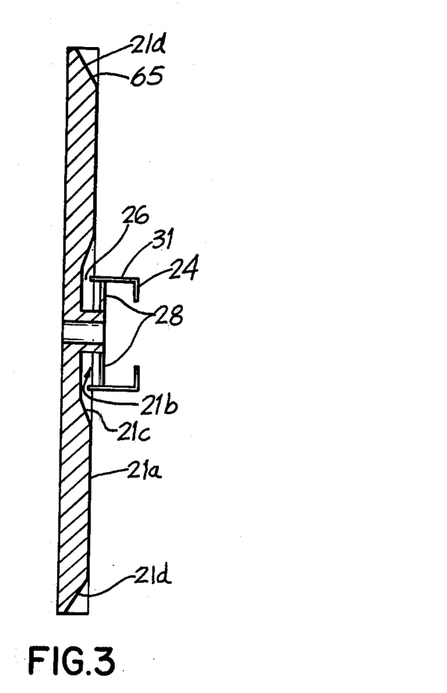
FIG. 3 is a side, sectional, elevational view of the apparatus of FIG. 2 taken along lines 3—3 thereof.
Figures 4A, 4B, 5, 6, 7, 8, 9, 10, 11, 18, 19:
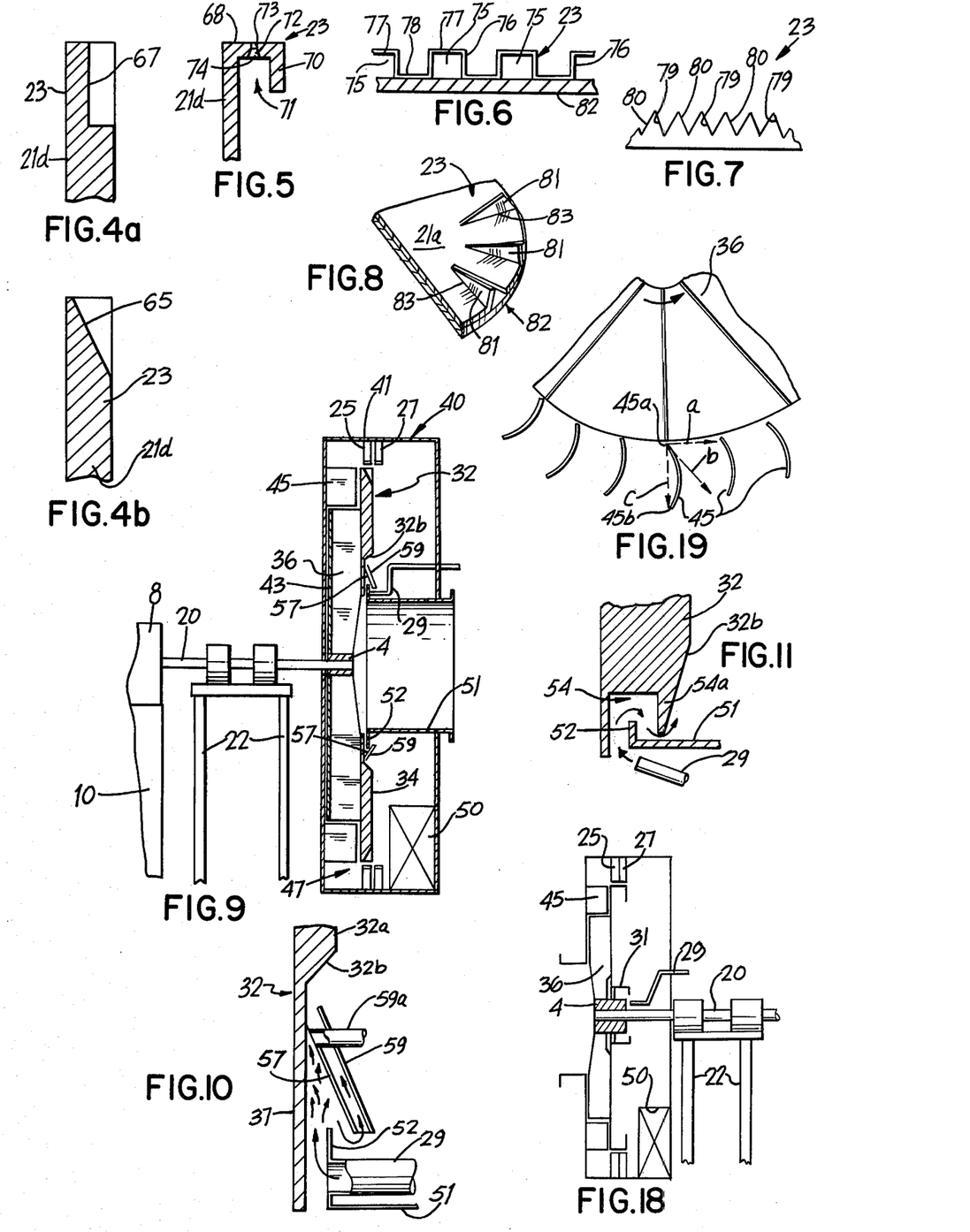
FIG. 4a is a partial, side, sectional view of a portion of one embodiment of the rotatable impeller of the present invention.
FIG. 4b is a partial, side, sectional view of a portion of another embodiment of the rotatable impeller of the present invention.
FIG. 5 is a partial, side, sectional view of another embodiment of the rotatable impeller of the present invention.
FIG. 6 is a partial, side, sectional view of another embodiment of the rotatable impeller of the present invention.
FIG. 7 is a partial, side, sectional view of another embodiment of the rotatable impeller of the present invention.
FIG. 8 is a partial, top perspective view of another embodiment of the rotatable impeller of the present invention.
FIG. 9 is a partial, side, sectional, elevational view of a portion of one embodiment of a combined rotatable impeller including first and second sections in accordance with one embodiment of the present invention.
FIG. 10 is a partial, side, sectional, elevational view of a portion of a liquid seal of one embodiment of the rotatable impeller of the present invention.
FIG. 11 is a partial, side, sectional, elevational view of a portion of another liquid seal of the present invention.
FIG. 18 is a schematic representation of a combined apparatus in accordance with another embodiment of the present invention.
FIG. 19 is a diagrammatical representation of a portion of the gas impeller and diffuser of the present invention.

Elements 23 must be of a nature so as to produce discrete fluid jets at the outer periphery of the impeller. They may, however, be formed from the impeller itself, as shown in FIGS. 4a, 4b, and 7, or built up on the surface of the impeller, as shown in FIGS. 5, 6 and 8. The particular embodiments shown thus include a sloping surface 65, as shown in FIGS. 2, 3 and 4b, forming a plurality of grooves around the periphery of the impeller. Also shown in FIG. 4a are rectangular notches 67 and in FIG. 5, a continuous upstanding annular wall portion 68, including inwardly directed annular lip 70 forming a trough, 71, in which fluid may collect, and then form into jets by passing through a plurality of orifices 72, which can include a cylindrical portion 73 and a circular tapered inlet 74 coaxial therewith. FIG. 6 shows another embodiment of these jet forming elements 23, in this case, as viewed from the outer periphery of the impeller towards its axis of rotation, including a series of upstanding blocks 75 formed at that periphery, including upstanding walls 76 and upper and lower cross members, 77 and 78, respectively, mounted upon a circular phase plate 82. FIG. 7 shows a similar embodiment, but in this case a series of teeth 79 are produced at the periphery thereof, each including sloping surfaces 80. Finally, FIG. 8 shows yet another such embodiment, in this case where a series of sloping ramp members 81 are affixed to the impeller itself, again including a circular base plate 82, which is particularly important in this case so that openings are not left through the entire face of the impeller itself. Thus, V-shaped notches can be formed at the periphery and folded up along one side 83 thereof.

The scrubbing fluid can be supplied to the well portion 21b of the impeller 21 by means of the apparatus shown in FIG. 1. This includes an open-ended cylindrical scrubbing fluid directing member 31 circumferentially placed around the axis of the impeller 21, and including inwardly directed annular lip 24. This entire scrubbing fluid directing member 31 is in turn mounted on the axis by means of struts 28. In this manner, scrubbing fluid enters through conduit 29, which terminates at the opening formed by inwardly directed lip 24, as shown in FIGS. 1 and 3, and is retained within the fluid directing member 31 and directed onto the surface of the impeller at the well portion 21b. From there the fluid is projected outwardly by the centrifugal force created by the rapid rotation of impeller 21 without leaving the surface of the impeller. It is thus important that the end 26 of fluid directing member 31 extend to a point below the planar surface 21a of impeller 21, as is specifically shown in FIG. 3.

In connection with the operation of the embodiment shown in FIG. 1, the gas which is to be cleaned enters inlet 3 of the outer housing 2, generally under the influence of a blower, fan or other means, and is forced to pass between inner and outer housings 7 and 2, through the annular passage discussed above. At the same time, scrubbing fluid is fed through conduit 29 and is expelled from the end of conduit 29 at a point near the axis of rotation of impeller 21. This fluid is thus directed by means of the fluid directing member 31 and its inwardly extending lip 24 into the well portion 21b of impeller 21, at a point below its upper surface 21a. The impeller 21 rotates rapidly, e.g., at the speeds at the outer periphery of from 80 to 100 ft/sec. and upward, to much greater speeds, and this high speed forms a rapidly rotating curtain of scrubbing fluid, which is thrown outwardly to form a substantially continuous sheet of scrubbing fluid on the flat upper surface 21a of impeller 21. As the scrubbing fluid passes outwardly, and when it reaches the outer periphery of impeller 21, it is formed into a plurality of discrete scrubbing fluid jets by means of members 23, so as to produce a rapidly rotating scrubbing fluid curtain of discrete jets within the annular passage between inner and outer housings 7 and 2, respectively. As is also set forth above, fixed vanes 25 redirect the gas flow so that it is directed against the direction in which the impeller is rotating, and thus the impacting of the scrubbing fluid and the gas stream results in atomization of the liquid and ultimate particulate collection.

The major portion of the scrubbing fluid, now containing particulate matter cleansed from the gas, can now be drained out of the device through drain 36, which is tangential to the impeller and oriented with respect to the rotational direction of the impeller to assist in the discharge thereof. The cleaned or scrubbed gas continues on through the annular passage, this time redirected by vanes 27, which are oriented in the direction of the scrubbing fluid, and finally through outlet 5 for further demisting where desired.

In the scrubbing fluid impeller 21 shown in FIG. 14, as noted above, the base 21a thereof is conical in configuration, and the angle $\alpha$ is from about 120° to 175°. Furthermore, in this embodiment the scrubbing fluid directing member 31a employed is not cylindrical, as is the open-ended cylindrical scrubbing fluid directing member 31 in FIGS. 1 and 3, but is a truncated right circular conical section with its larger diameter located adjacent to the impeller surface. Further, this end 31b of the scrubbing fluid directing member 31a, is located beneath a plane established by connecting together the elevated ends or periphery of the impeller 21 itself, again in order to insure that the scrubbing fluid will remain on the surface of the impeller during its rotation, and held in place by stays 28a.

Figure 12:
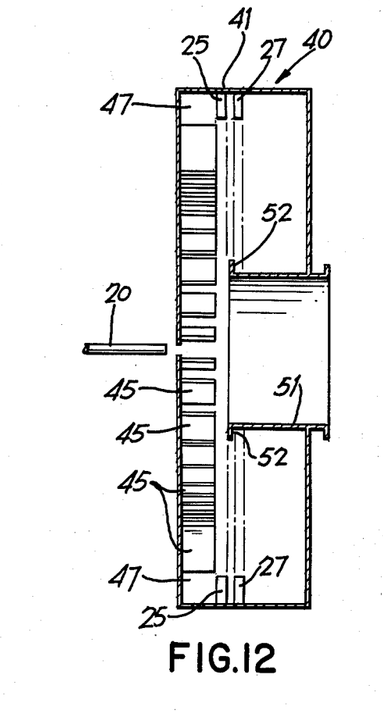
FIGS. 12 and 13 are partial, side, sectional, elevational views, shown together in an exploded manner, of the embodiment of the combined impeller members of the present invention as shown in FIG. 9.
Figure 13:
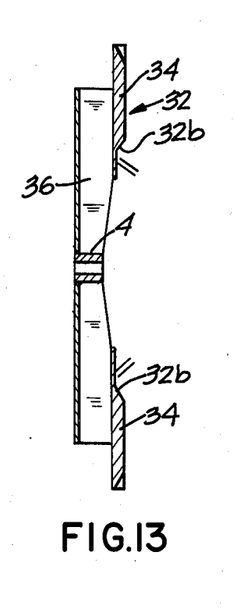

As is discussed above in the embodiment shown in FIG. 1, as well as in the apparatus shown in U.S. Pat. No. 3,596,885, it is generally necessary to supply the gas to inlet 3 with the assistance or under the influence of a blower, fan or other means for accelerating the gas stream therethrough. In the embodiment shown in FIG. 9, however, the impeller is combined with a blower, and both functions, namely generation of a rapidly rotating curtain of discrete jets scrubbing fluid, and acceleration of the gas stream through that curtain, are effected by a single apparatus. Referring specifically to FIGS. 9, 12 and 13, a portion of an overall apparatus such as that of FIG. 1 is shown. The impeller 32 in this case, however, includes two sections (FIG. 13), namely a scrubbing fluid impeller section 34, which is in many respects similar or equivalent to impeller 21 in FIG. 1, and a gas impeller section 36 axially displaced therefrom.

In the embodiment shown in FIG. 9, there is no need for inner and outer housings 7 and 2 to be employed precisely as shown in FIG. 1 in order to establish a location for gas scrubbing therein. In this case, by employing combined gas and scrubbing fluid impeller means, the configuration of housing 40 is such as to produce scrubbing in the annular space between the outer wall 41 of housing 40 and the outer periphery of the scrubbing liquid impeller 32. Within that area fixed vanes 25 and 27 are again established, with vanes 25 insuring that the direction of flow of the gas is against or counter to that of the direction of rotation of the scrubbing liquid impeller, so as to direct the gas against the oncoming liquid stream as is discussed above, and with vanes 27 insuring that the direction of flow of the gas is concurrent with that of the scrubbing fluid at the point of discharge.

The gas impeller member 36 shown in FIG. 9 can also be seen in FIG. 13. Both the gas and scrubbing liquid impeller sections are attached to a common hub 4 which in turn is affixed to shaft 20. The liquid impeller section 32 is affixed to the blades of the gas impeller member 36 for rotation therewith. Axially displaced therefrom, and also affixed to hub 4 for rotation therewith is circular rear wall member 43. The gas impeller member or section of the impeller thus acts as a blower for gas entering the central portion, shown in FIG. 9, and for being forced centrifugally outward therefrom. At the peripheral section of the gas impeller section 36 are located fixed diffuser vanes, 45. The purpose of these diffuser vanes 45 is to alter the direction of flow of the gas to be scrubbed, which has now been accelerated outwardly by the centrifugal force imparted by the rotation of gas impeller member 36. In particular, these fixed diffuser vanes 45 are oriented so as to substantially reduce the rotational component of that flowing gas stream while, and to act as a diffuser for the gas, i.e. to increase its static pressure while reducing its velocity. In particular, this can be accomplished by establishing these diffuser vanes in a manner such as is shown in FIG. 19. That is, the diffuser vanes 45 are themselves arcuated in configuration, and their inner or inlet end 45a is oriented in a direction which is coincident with the resultant vector b of the rotational component a and the radial component c of the flowing gas, induced by rotation of the gas impeller 36 in the direction of rotation as shown by the arrow therein. Further, their outer or outlet end 45b are thus substantially radial, or may face in a direction opposed to that of the impeller's rotation, and the direction of the gas is thus altered so as to exit from the impeller in that direction. The gas stream can now not only exit from the periphery of the gas impeller section in a substantially radial direction, but also at a higher pressure and at a lower velocity. The direction of flow of this gas stream is now diverted into diffuser exit plenum 47 and along the outer wall of housing 40 so as to pass through vanes 25 and 27. This gas stream thus passes through the rapidly rotating scrubbing fluid curtain which has been established at the outer periphery of the scrubbing fluid impeller section 32. After passage therethrough, the scrubbed gas stream can exit housing 40 through outlet 50 extending outward tangentially from housing 40 in concert with the direction of rotation of the gas.

The supply of scrubbing fluid to the planar face 34 of scrubbing fluid impeller section 32 shown in FIG. 9, will now be explained in more detail, with specific reference to FIGS. 9 and 11. As is shown in FIG. 9, gas entering through an inlet section is generally directed between fixed inner wall section 51 of housing 40, producing a cylindrical duct inlet member as shown in FIGS. 9 and 11, the inner end of wall member 51 includes radial outwardly extending annular lip member 52. Scrubbing fluid is delivered to the inner side of this annular lip member 52 by means of scrubbing fluid conduit supply member 29. This can be accomplished in several ways, including bypassing directly through the lip member 52, or shown in FIGS. 9 and 10, or by being directed to the inner face of wall member 51, as shown in FIG. 11.

In the embodiment shown in FIG. 11, a radially recessed well 54 is formed by the surface of scrubbing fluid impeller section 32 and radial inwardly projecting arm 54a. It is essential for this arm 54a to extend to a point radially inward from the outer end of radial projecting lip member 52, so that when scrubbing fluid is supplied through conduit 29 and passes outwardly well 54 is filled with fluid, and lip member 52 becomes immersed in that fluid. This creates the aforementioned fluid seal between the gas inlet and the interior of housing 40 so that the gas to be scrubbed cannot pass directly to outlet 50 and bypass the gas impeller section 36. In addition, the overflowing fluid from well 54 overflows arm 54a and passes outwardly over the sloping surface 32b of the rotatable liquid impeller 32. Thus, the same fluid which creates the fluid seal also establishes the rapidly rotating curtain of discrete jets of scrubbing fluid at the outer periphery of impeller 32.

Yet another different combined scrubbing fluid delivery and fluid seal mechanism, in this case for the apparatus of FIG. 9, is shown in detail in FIG. 10. In this embodiment, a baffle member 57 projects linearly and at an angle from a point within well portion 32b of scrubbing fluid impeller 32. In this case, scrubbing fluid conduit 29 is connected directly to the radial outwardly extending lip 52 of annular wall member 51 so that the scrubbing fluid passes therethrough, as is shown by the arrows in FIG. 10. It is essential in this case that the inwardly extending baffle 57 terminate at a point radially inward as compared to the outwardly extending lip 52, again so that the end of lip portion 52 remains immersed in scrubbing fluid during use, and that upon rapid rotation of the rotatable scrubbing fluid impeller, scrubbing fluid is maintained between baffle 57 and wall 37 so as to form the liquid seal discussed above. Furthermore, the overflowing scrubbing fluid again passes through the inwardly projecting end of baffle 57, as shown by the arrows therein. In this embodiment, a fluid directing channel is established by means of conduit 59 fixed to the outer surface of baffle 57 to direct the scrubbing fluid to a point within the well portion 32b of impeller 32, so that it can then pass upwardly to surface 32a of impeller 32.

As is also shown in FIG. 10, a bleed conduit 59a is connected to baffle 57 to provide an outlet for removing suspended matter contained in the scrubbing fluid being fed through line 29 which gravitates to this zone under the influence of the centrifugal forces created therein by permitting a small fraction of the scrubbing fluid fed to be bled therefrom.

Referring next to FIG. 18, another embodiment of a combined gas and fluid impeller similar to that of FIG. 9 is shown schematically. Here, however, the gas inlet is located on the left of the Figure, and the gas passes through the apparatus without it being necessary to reverse its flow, as is the case in FIG. 9. It is therefore also unnecessary to include the fluid seal arrangements of FIGS. 9-11, and a fluid delivery system similar to that in FIG. 1 can now be utilized. It is, however, specifically adapted in this case to accommodate the extension of shaft 20 therethrough.

Figure 15:
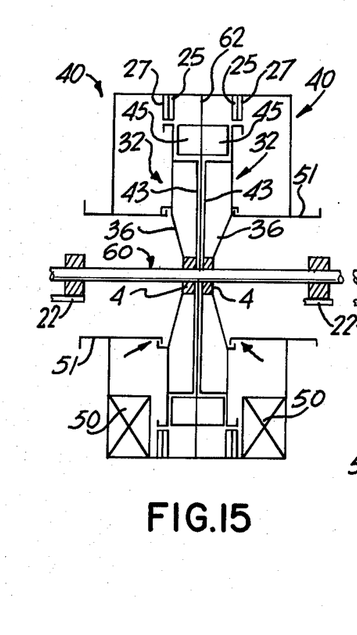
FIG. 15 is a schematic representation of a combined apparatus in accordance with one embodiment of the present invention.
Figures 16, 17:
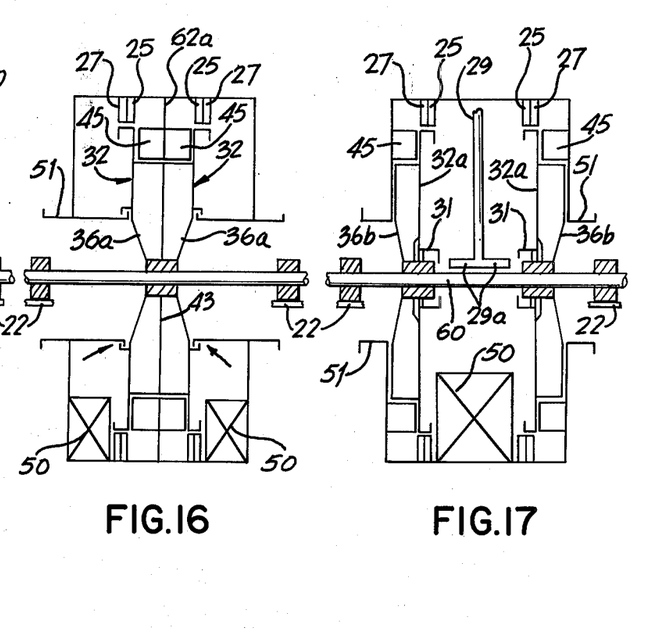
FIG. 16 is a schematic representation of a combined apparatus in accordance with another embodiment of the present invention.
FIG. 17 is a schematic representation of a combined apparatus in accordance with another embodiment of the present invention.

Referring next to FIGS. 15-17, several embodiments employing more than one of the combined rotatable gas/scrubbing fluid impellers, as shown for example in FIG. 9, are employed. In FIG. 15, for example, a pair of combined gas/scrubbing fluid impellers are placed in a back-to-back relationship along a common axis 60. Thus, in this case, gas can enter through two inlets 51 on either side of hubs 4, pass outwardly under the influence of gas impeller sections 36, through the respective scrubbing fluid curtains established by rapidly rotating scrubbing fluid impeller sections 32, and outward into housings 40 and, finally, through exits 50. In the embodiment shown in FIG. 16, although similar to that in FIG. 15, in this case, the common fixed wall member 62 shown in FIG. 15 has been eliminated, except the extent members 62a are required to hold diffuser vanes 45 in place, and a rotating circular rear wall member 43 is shared commonly by the two gas impellers 36a, and a single fixed diffuser vane support member 62a is now employed to support the diffuser vanes 45 and to maintain the division of gas flow therein.

In the embodiment shown in FIG. 17, the pair of combined fluid and gas impellers are separated along common axis 60. In this case, the scrubbing fluid impellers 32a are arranged in a face to face relationship with respect to each other, and each in turn is arranged in a back-to-back relationship with respect to a pair of gas impellers 36a. The scrubbing fluid thus enters through conduit 29, is separated into arms 29a, and is directed towards the two facing impellers 32b. The gas, however, enters through inlets 51 on either side, is impelled outwardly by gas impellers 36b, and again pass through the rapidly rotating curtain of discrete jets of scrubbing fluid maintained between vanes 25 and 27. The scrubbed gas then exit through a common central outlet 50.

What is claimed is:

1. Apparatus for scrubbing a gas with a scrubbing fluid comprising rotatable impeller means having first and second axially displaced sections and an outer periphery, said first and second axially displaced sections being rotatable about a common axis, scrubbing fluid supply means for supplying said scrubbing fluid to said first section of said rotatable impeller means, gas supply means for supplying said gas to be scrubbed to said second section of said rotatable impeller means, so that upon rapid rotation of said rotatable impeller means about said axis said scrubbing fluid and said gas are impelled outwardly from said first and second sections of said rotatable impeller means, respectively, said scrubbing fluid thereby forming a rapidly rotating scrubbing fluid curtain at said outer periphery of said impeller means, and means for altering the direction of said gas as it flows rapidly outwardly from said second section of said rotatable impeller means so that said gas passes through said rapidly rotating scrubbing fluid curtain in a direction opposed to the direction of rotation of said scrubbing fluid so as to scrub said gas with said scrubbing fluid, said means for altering the direction of said gas including diffuser vane means located at the outer periphery of said second section of said rotatable impeller means for substantially reducing the rotational component of said gas.

2. The apparatus of claim 1 wherein said diffuser vane means comprises a plurality of diffuser vanes said diffuser vanes being arcuate and including a first end and a second end, said first end being located radially inward with respect to said second end, said first end of said diffuser vanes being substantially coincident with the resultant vector of the radial and rotational vectors of said gas as it is impelled outwardly from said second section, and said second end of said diffuser vanes being directed so that said gas is impelled outwardly from said second section at a lower velocity in a substantially radial direction, and at an increased static pressure.

3. The apparatus of claim 1 wherein said first section of said rotatable impeller means comprises an annular scrubbing fluid distribution surface defined by inner and outer annular surface portions radially displaced from said axis, said inner surface portion being substantially planar and said outer surface portion including a plurality of discrete scrubbing fluid jet forming members for interrupting said substantially planar surface so as to channel said scrubbing fluid into discrete scrubbing fluid jets.

4. The apparatus of claim 3 wherein said gas supply means passes through said first section of said rotatable impeller means, and including fluid seal means for providing a fluid seal between said gas supply means and said first section of said rotatable impeller means to prevent said gas from bypassing said second section of said rotatable impeller means.

5. The apparatus of claim 4 wherein said scrubbing fluid supply means comprises a scrubbing fluid conduit located adjacent to said axis of rotation of said first section of said rotatable impeller means, and wherein said fluid seal means is also located adjacent to said axis of rotation of said first section of said rotatable impeller means, so that said scrubbing fluid conduit feeds said scrubbing fluid to said fluid seal means prior to its supply to said first section of said rotatable impeller means, so that said scrubbing fluid comprises the fluid to establish said liquid seal and wherein said scrubbing fluid supply means is located radially inward from said fluid seal means.

6. The apparatus of claim 5 wherein said fluid seal means comprises a generally axially extending wall member extending from said annular scrubbing fluid distribution surface so that said scrubbing fluid builds up against said wall member as it passes radially outward from said first section of said rotatable impeller means.

7. The apparatus of claim 6 wherein said generally axially extending wall member has a substantially L-shaped cross-section, including an axially extending leg and an inwardly directed radially extending leg.

8. The apparatus of claim 7 wherein said scrubbing fluid conduit terminates at a point located radially inward from said generally axially extending wall member.

9. The apparatus of claim 3 wherein said annular scrubbing fluid distribution surface includes a central annular surface portion located radially inward from said inner annular surface portion, said central annular surface portion surrounding said axis and comprising an axially displaced well disposed below said substantially planar inner annular surface portion so that said scrubbing fluid must move upwardly out of said well portion onto said inner annular surface portion as it passes outwardly from said first section of said rotatable impeller means.

10. The apparatus of claim 6 including scrubbing fluid bleed means communicating with the inner surface of said axially extending wall member for the removal of solids contained in said scrubbing fluid that may build up against said well member.

11. The apparatus of claim 1 wherein said first and second axially displaced sections of said rotatable impeller means are affixed to each other for rotation together about said common axis.

12. The apparatus of claim 11 wherein said first and second axially displaced sections are affixed to a common rotatable wall member.

13. The apparatus of claim 1 comprising a plurality of said rotatable impeller means.

14. The apparatus of claim 13 wherein said plurality of rotatable impeller means comprises first rotatable impeller means and second rotatable impeller means.

15. The apparatus of claim 14 wherein said second sections of both said first and second rotatable impeller means are located adjacent to each other along said common axis.

16. The apparatus of claim 15 wherein said second sections of both said first and second rotatable impeller means are affixed to each other for common rotation.

17. The apparatus of claim 14 wherein said second sections of both said first and second rotatable impeller means are spaced apart from each other along said common axis.

18. The apparatus of claim 17 including common gas exit means located between said second sections of said first and second rotatable impeller means for the discharge of said gas after said gas has passed through said rapidly rotating scrubbing fluid curtains created at the outer periphery of said first sections of said first and second rotatable impeller means.

19. A method of scrubbing a gas with a scrubbing fluid which comprises supplying said gas to a first location adjacent to the axis of rotation of rotatable gas impeller means, supplying said scrubbing fluid to a second location adjacent to the axis of rotation of rotatable scrubbing fluid impeller means including an outer periphery, said axes of rotation comprising a common axis, and said first and second locations being axially displaced from each other along said common axis, thereby causing said gas and said scrubbing fluid to pass radially outward from said first and second locations, respectively, in first and second axially displaced planes by rapidly rotating both said rotatable gas and scrubbing fluid impeller means about said common axis of rotation, thereby forming a rapidly rotating scrubbing fluid curtain at said outer periphery of said scrubbing fluid impeller means, and altering the direction of flow of said gas as it flows radially outward from said rotatable gas impeller means in a manner so as to substantially reduce the rotational component of said flow of gas caused by the rapid rotation of said gas impeller means and to act as a diffuser for said gas, and so that said gas is diverted from said first plane to cross said second plane and pass through said rapidly rotating scrubbing fluid curtain in a direction opposite to that of the direction of flow of said scrubbing fluid.

20. The method of claim 19 including forming a substantially continuous sheet of said scrubbing fluid at a first radial location in said second plane as said scrubbing fluid passes radially outward from said second location, and subsequently forming said substantially continuous sheet of said scrubbing fluid into a plurality of discrete scrubbing fluid jets at a second radial location in said second plane, said second radial location being at said outer periphery of said rotatable scrubbing fluid impeller means.

21. The method of claim 19 including causing said rotatable gas impeller means and said rotatable scrubbing fluid impeller means to rotate together at the same rate.

22. The method of claim 19 wherein said gas is supplied to said first location by first passing said gas through said second location, and including providing a fluid seal between said rotatable scrubbing fluid impeller means and said gas passing through said second location so as to prevent said gas from bypassing said first location.

23. The method of claim 22 including employing said scrubbing fluid passing radially outward from said second location to provide said fluid seal.

24. The method of claim 23 wherein said scrubbing fluid is supplied to said second location at a point located radially inward from said fluid seal.

25. The method of claim 24 including delivering said scrubbing fluid to a point axially displaced below said first radial location wherein said substantially continuous sheet of scrubbing fluid is formed so that said scrubbing fluid must pass axially upward to reach said first radial location.

26. The method of claim 23 including centrifuging said scrubbing fluid at said fluid seal and bleeding a portion of said centrifugal scrubbing fluid so as to remove solids contained in said scrubbing fluid.

27. Apparatus for scrubbing a gas with a scrubbing fluid comprising rotatable scrubbing fluid impeller means, said rotatable scrubbing fluid impeller means being mounted on an axis for rotation thereabout and including an annular scrubbing fluid distribution surface including a substantially conical portion and a plurality of discrete scrubbing fluid jet forming means for interrupting said surface so as to channel said scrubbing fluid into discrete scrubbing fluid jets and to form a rapidly rotating scrubbing fluid curtain of discrete jets at the outer periphery of said annular scrubbing fluid distribution surface upon the rapid rotation of said rotatable scrubbing fluid impeller means, scrubbing fluid supply means for supplying scrubbing fluid to the inner surface of said scrubbing fluid distribution surface so as to produce a substantially continuous sheet of said scrubbing fluid on said scrubbing fluid distribution surface upon rapid rotation of said rotatable scrubbing fluid impeller means, and gas redirection means for passing said gas to be scrubbed through said rapidly rotating scrubbing fluid curtain of discrete jets in a direction opposed thereto so as to scrub said gas with said scrubbing fluid.

28. The apparatus of claim 27 wherein said annular scrubbing fluid distribution surface is substantially planar.

29. The apparatus of claim 27 wherein said annular scrubbing fluid distribution surface includes inner and outer annular surface portions, and said outer annular surface portion includes said plurality of discrete scrubbing fluid jet forming means.

30. The apparatus of claim 29 wherein said inner annular surface portion is substantially planar.

31. The apparatus of claim 29 wherein said inner annular surface portion is substantially conical.

32. The apparatus of claim 27 wherein said gas redirection means includes a plurality of fixed vanes located adjacent to said periphery of said rotatable impeller means and positioned so as to redirect said gas into said direction opposed to the direction of flow of said rapidly rotating scrubbing fluid curtain.

33. The apparatus of claim 27 including an outer housing, and an inner housing mounted concentrically with said inner housing so as to form an annular passage therebetween, said rotatable scrubbing fluid impeller means being location within said inner housing, said inner housing including an annular aperture to permit said rapidly rotating scrubbing fluid curtain to pass freely from said inner housing and into said annular passage.

34. The apparatus of claim 27 wherein said annular scrubbing fluid distribution surface includes a central annular portion surrounding said axis, and wherein said scrubbing fluid supply means supplies said scrubbing fluid to said central annular portion, and wherein said central annular portion comprises an axially displaced well disposed below said substantially planar inner annular surface portion so that said scrubbing fluid must move upwardly out of said well portion onto said inner annular surface portion as it passes outwardly from said central annular portion of said annular scrubbing fluid distribution surface.

35. The apparatus of claim 34 wherein said scrubbing fluid supply means includes a scrubbing fluid conduit terminating a predetermined distance from said central annular portion of said annular scrubbing fluid distribution surface and scrubbing fluid directing means mounted on said axis for directing said scrubbing fluid from the end of said scrubbing fluid conduit to said central annular portion, said scrubbing fluid directing means being spaced from said end of said scrubbing fluid conduit so that said scrubbing fluid directing means is free to rotate with said rotatable scrubbing fluid impeller means without interference from said scrubbing fluid conduit while at the same time substantially all of said scrubbing fluid passes from the end of said scrubbing fluid conduit to said central annular position of said rotatable scrubbing fluid impeller means.

36. The apparatus of claim 27 including rotatable gas impeller means mounted for rotation about said axis, said rotatable gas impeller means being axially displaced from said scrubbing fluid means along said axis, gas supply means for supplying said gas to be scrubbed to said rotatable gas impeller means, so that upon rapid rotation of said rotatable gas impeller means about said axis said gas is impelled outwardly therefrom towards said gas redirection means.

37. The apparatus of claim 36 including diffuser vane means located at the outer periphery of said rotatable gas impeller means for substantially reducing the rotational component of said gas while acting as a diffuser for said gas.

38. The apparatus of claim 37 wherein said diffuser vane means comprises a plurality of vanes, said diffuser vanes being arcuate and including a first end and a second end, said first end being located radially inwardly with respect to said second end, said first end of said diffuser vanes being directed substantially coincident with the resultant vector of the radial and rotational vectors of said gas as it is impelled outwardly from a rotatable gas impeller means, and said second end of said diffuser vanes being directed so that said gas is impelled outwardly from said second section at a lower velocity and in a substantially radial direction, and at an increased static pressure.

39. A method for scrubbing a gas with a scrubbing fluid which comprises supplying said scrubbing fluid to a location adjacent to the axis of rotation of rotatable scrubbing fluid impeller means including an annular scrubbing fluid distribution surface so as to project said scrubbing fluid radially outward upon the rapid rotation of said rotatable scrubbing fluid impeller means, said location adjacent to said axis of rotation being displaced below said annular scrubbing fluid distribution surface so that said scrubbing fluid must pass axially upward onto said annular scrubbing fluid distribution surface as it is projected radially outward from said location forming a substantially continuous sheet of said scrubbing fluid on said annular scrubbing fluid distribution surface, forming said substantially continuous sheet of said scrubbing fluid into a plurality of discrete scrubbing fluid jets so as to form a rapidly rotating scrubbing fluid curtain of discrete jets at the outer periphery of said annular scrubbing fluid distribution surface upon the rapid rotation of said rotatable scrubbing fluid impeller means, and passing said gas to be scrubbed through said rapidly rotating scrubbing fluid curtain in a direction opposite thereto so as to scrub said gas with said scrubbing fluid.

40. The method of claim 39 including supplying said gas to be scrubbed to a location adjacent to the axis of rotation of rotatable gas impeller means, said axis of rotation of said rotatable gas impeller means being common to said axis of rotation of said rotatable scrubbing fluid impeller means, and projecting said gas radially outward upon the rapid rotation of said rotatable gas impeller means.

41. The method of claim 40 including altering the direction of flow of said gas as it flows radially outward from said rotatable gas impeller means in a manner so as to substantially reduce the rotational component of said flow of gas as it is projected radially outward by said rotatable gas impeller means, and to act as a diffuser for said gas.

42. Apparatus for scrubbing a gas with a scrubbing fluid comprising rotatable scrubbing fluid impeller means, said rotatable scrubbing fluid impeller means being mounted on an axis for rotation thereabout and including a scrubbing fluid distribution hub located adjacent to said axis, fluid distribution means for directing said scrubbing fluid radially outward from said fluid distribution hub, and an outer periphery, scrubbing fluid supply means for supplying said scrubbing fluid to said fluid distribution hub, so that upon rapid rotation of said rotatable scrubbing fluid impeller means said scrubbing fluid is directed radially outward by said fluid distribution means so as to form a rapidly rotating scrubbing fluid curtain at the outer periphery of said rotatable scrubbing fluid impeller means, said scrubbing fluid supply means including a scrubbing fluid conduit terminating a predetermined distance from said scrubbing fluid distribution hub and scrubbing fluid directing means mounted on said axis for directing said scrubbing fluid from the end of said scrubbing fluid conduit to said fluid distribution hub, said scrubbing fluid directing means being spaced from said end of said scrubbing fluid conduit so that said scrubbing fluid directing means is free to rotate with said rotatable scrubbing fluid impeller means without interference from said scrubbing fluid conduit while at the same time substantially all of said scrubbing fluid passes from the end of said scrubbing fluid conduit to said fluid distribution hub, and means for passing said gas to be scrubbed through said rapidly rotating scrubbing fluid curtain at the outer periphery of said rotatable scrubbing fluid impeller means so as to scrub said gas with said scrubbing fluid.

43. The apparatus of claim 42 wherein said fluid distribution means of said rotatable scrubbing fluid impeller means comprises an annular scrubbing fluid distribution surface and a plurality of discrete scrubbing fluid jet forming means for channelling said scrubbing fluid into discrete scrubbing fluid jets and to form a rapidly rotating scrubbing fluid curtain of discrete jets.

44. The apparatus of claim 43 wherein said annular scrubbing fluid distribution surface is substantially planar.

45. The apparatus of claim 43 wherein said annular scrubbing fluid distribution surface includes a substantially conical portion.

46. The apparatus of claim 43 wherein said annular scrubbing fluid distribution surface includes inner and outer annular surface portions, and said outer annular surface portion includes said plurality of discrete scrubbing jet forming means.

47. The apparatus of claim 46 wherein said inner annular surface portion is substantially planar.

48. The apparatus of claim 43 wherein said scrubbing fluid distribution hub is axially displaced below said annular scrubbing fluid distribution surface so that said scrubbing fluid must pass axially upward onto said annular scrubbing fluid distribution surface as it is projected radially outward from said scrubbing fluid distribution hub.

49. The apparatus of claim 42 wherein said scrubbing fluid directing means comprises a cylindrical member coaxially disposed about said axis.

50. The apparatus of claim 49 wherein said cylindrical member includes an annular collar radially projecting inwardly from said end of said cylindrical member adjacent to said scrubbing fluid conduit and terminating a predetermined distance therefrom.

51. The apparatus of claim 49 wherein said cylindrical member includes a first end and a second end, said first end being adjcent to said scrubbing fluid distribution hub and terminating at a point displaced axially below said annular scrubbing fluid distribution surface so as to prevent said scrubbing fluid from leaving the surface of said rotatable scrubbing fluid impeller means as it passes radially outward upon the rapid rotation of said rotatable scrubbing fluid impeller means.

52. The apparatus of claim 42 wherein said scrubbing fluid directing means comprises a truncated right circular section with the larger diameter located adjacent to said rotatable impeller.

53. Apparatus for scrubbing a gas with a scrubbing fluid comprising rotatable impeller means having first and second axially displaced sections and an outer periphery, said first and second axially displaced sections being rotatable about a common axis and being located in first and second displaced parallel planes, scrubbing fluid supply means for supplying said scrubbing fluid to said first section of said rotatable impeller means, gas supply means for supplying said gas to be scrubbed to said second section of said rotatable impeller means, so that upon rapid rotation of said rotatable impeller means about said axis said scrubbing fluid and said gas are impelled outwardly from said first and second sections of said rotatable impeller means in said first and second displaced parallel planes, respectively, said scrubbing fluid thereby forming a rapidly rotating scrubbing fluid curtain at said outer periphery of said impeller means and in said first plane, and means for altering the direction of said gas as it flows rapidly outwardly from said second section of said rotatable impeller means out of said second plane so that said gas passes through said rapidly rotating scrubbing fluid curtain in a direction opposed to the direction of rotation of said scrubbing fluid in said first plane so as to scrub said gas with said scrubbing fluid.

54. The apparatus of claim 53 including diffuser vane means located at the outer periphery of said second section of said rotatable impeller means for substantially reducing the rotational component of said gas.

55. The apparatus of claim 53 wherein said first section of said rotatable impeller means comprises an annular scrubbing fluid distribution surface defined by inner and outer annular surface portions radially displaced from said axis, said outer surface portion being substantially planar and said outer surface portion including a plurality of discrete scrubbing fluid jet forming members for interrupting said substantially planar surface so as to channel said scrubbing fluid into discrete scrubbing fluid jets.

56. The apparatus of claim 55 wherein said gas supply means passes through said first section of said rotatable impeller mans, and including fluid seal means for providing a fluid seal between said gas supply means and said first section of said rotatable impeller means to prevent said gas from bypassing said second section of said rotatable impeller means.

57. The apparatus of claim 55 wherein said annular scrubbing fluid distribution surface includes a central annular surface portion located radially inward from said inner annular surface portion, said central annular surface portion surrounding said axis and comprising an axially displaced well disposed below said substantially planar inner annular surface portion so that said scrubbing fluid must move upwardly out of said well portion onto said inner annular surface portion as it passes outwardly from said first section of said rotatable impeller means.

58. A method of scrubbing a gas with a scrubbing fluid which comprises supplying said gas to a first location adjacent to the axis of rotation of rotatable gas impeller means, supplying said scrubbing fluid to a second location adjacent to the axis of rotation of rotatable scrubbing fluid impeller means including an outer periphery, said axes of rotation comprising a common axis, and said first and second locations being axially displaced from each other along said common axis, thereby causing said gas and said scrubbing fluid to pass radially outward from said first and second locations, respectively, in first and second axially displaced parallel planes by rapidly rotating both said rotatable gas and scrubbing fluid impeller means about said common axis of rotation, thereby forming a rapidly rotating scrubbing fluid curtain at said outer periphery of said scrubbing fluid impeller means in said second plane, and a flow of gas in said first plane, and altering the direction of said flow of gas as it flows radially outward from said rotatable gas impeller means in said first plane so that said gas is diverted from said first plane to cross said second plane and thereby pass through said rapidly rotating scrubbing fluid curtain in said second plane in a direction opposite to that of the direction of flow of said scrubbing fluid.

59. The method of claim 58 including altering the direction of flow of said gas as it flows radially outward from said gas impeller means in a manner so as to substantially reduce the rotational component of said flow of gas caused by the rapid rotation of said gas impeller means and to act as a diffuser for said gas.

60. The method of claim 59 including forming a substantially continuous sheet of said scrubbing fluid at a first radial location in said second plane as said scrubbing fluid passes radially outward from said second location, and subsequently forming said substantially continuous sheet of said scrubbing fluid into a plurality of discrete scrubbing fluid jets at a second radial location in said second plane, said second radial location being at said outer periphery of said rotatable scrubbing fluid impeller means.

61. The method of claim 58 wherein said gas is supplied to said first location by first passing said gas through said second location, and including providing a fluid seal between said rotatable scrubbing fluid impeller means and said gas passing through said second location so as to prevent said gas from bypassing said first location.

62. A method of scrubbing a gas with a scrubbing fluid which comprises supplying said gas to a first location adjacent to the axis of rotation of rotatable gas impeller means, supplying said scrubbing fluid to a second location adjacent to the axis of rotation of rotatable scrubbing fluid impeller means including an outer periphery, said axes of rotation comprising a common axis, and said first and second locations being axially displaced from each other along said common axis, thereby causing said gas and said scrubbing fluid to pass radially outward from said first and second locations, respectively, in first and second axially displaced planes by rapidly rotating both said rotatable gas and scrubbing fluid impeller means about said common axis of rotation, thereby forming a rapidly rotating scrubbing fluid curtain at said outer periphery of said scrubbing fluid impeller means, altering the direction of flow of said gas as its flows radially outward from said rotatable gas impeller means so that said gas is diverted from said first plane to cross said second plane and pass through said rapidly rotating scrubbing fluid curtain in a direction opposite to that of the direction of flow of said scrubbing fluid, said gas being supplied to said first location by first passing said gas through said second location, and providing a fluid seal between said rotatable scrubbing fluid impeller means and said gas passing through said second location so as to prevent said gas from bypassing said first location.

63. The method of claim 62 including employing said scrubbing fluid passing radially outward from said second location to provide said fluid seal.

64. The method of claim 62 wherein said scrubbing fluid is supplied to said second location at a point located radially inward from said fluid seal.

65. The method of claim 64 including delivering said scrubbing fluid to a point axially displaced below said first radial location wherein said substantially continuous sheet of scrubbing fluid is formed so that said scrubbing fluid must pass axially upward to reach said first radial location.

66. The method of claim 62 including centrifuging said scrubbing fluid at said fluid seal and bleeding a portion of said centrifuged scrubbing fluid so as to remove solids contained in said scrubbing fluid.

67. Apparatus for scrubbing a gas with a scrubbing fluid comprising rotatable scrubbing fluid impeller means, said rotatable scrubbing fluid impeller means being mounted on an axis for rotation thereabout and including an annular scrubbing fluid distribution surface, scrubbing fluid supply means for supplying scrubbing fluid to the inner surface of said scrubbing fluid distribution surface so as to produce a substantially continuous sheet of said scrubbing fluid on said scrubbing fluid distribution surface upon the rapid rotation of said rotatable scrubbing fluid impeller means, said annular scrubbing fluid distribution surface including a plurality of discrete scrubbing fluid jet-forming means located only at the periphery thereof for interrupting said surface so as to channel said substantially continuous sheet of scrubbing fluid into discrete scrubbing fluid jets and to form a rapidly rotating scrubbing fluid curtain of discrete jets at the outer periphery of said annular scrubbing fluid distribution surface upon the rapid rotation of said rotatable scrubbing fluid impeller means, and gas redirection means for passing said gas to be scrubbed through said rapidly rotating scrubbing fluid curtain of discrete jets in a direction opposed thereto so as to scrub said gas with said scrubbing fluid.

68. The apparatus of claim 67 wherein said annular scrubbing fluid distribution surface is substantially planar.

69. The apparatus of claim 67 wherein said annular scrubbing fluid distribution surface includes a substantially conical portion.

70. The apparatus of claim 67 wherein said gas redirection means includes a plurality of fixed vanes located adjacent to said periphery of said rotatable impeller means and positioned so as to redirect said gas into said direction opposed to the direction of flow of said rapidly rotating scrubbing fluid curtain.

71. The apparatus of claim 67 wherein said annular scrubbing fluid distribution surface includes a central annular portion surrounding said axis, and wherein said scrubbing fluid supply means supplies said scrubbing fluid to said central annular portion, said central annular portion comprising an axially displaced well disposed below said substantially planar inner annular surface portion so that said scrubbing fluid must move upwardly out of said well portion onto said inner annular surface portion as it passes outwardly from said central annular portion of said annular scrubbing fluid distribution surface.

72. The apparatus of claim 67 including rotatable gas impeller means mounted for rotation about said axis, said rotatable gas impeller means being axially displaced from said scrubbing fluid means along said axis, gas supply means for supplying said gas to be scrubbed to said rotatable gas impeller means, so that upon rapid rotation of said rotatable gas impeller means about said axis said gas is impelled outwardly therefrom towards said gas redirection means.

73. Apparatus for scrubbing a gas with a scrubbing fluid comprising rotatable scrubbing fluid impeller means, said rotatable scrubbing fluid impeller means being mounted on an axis for rotation thereabout and including an annular scrubbing fluid distribution surface including a plurality of discrete scrubbing fluid jet forming means for interrupting said surface so as to channel said scrubbing fluid into discrete scrubbing fluid jets and to form a rapidly rotating scrubbing fluid curtain of discrete jets at the outer periphery of said annular scrubbing fluid distribution surface upon the rapid rotation of said rotatable scrubbing fluid impeller means, scrubbing fluid supply means for supplying scrubbing fluid to the inner surface of said scrubbing fluid distribution surface so as to produce a substantially continuous sheet of said scrubbing fluid on said scrubbing fluid distribution surface upon rapid rotation of said rotatable scrubbing fluid impeller means, and gas redirection means for passing said gas to be scrubbed through said rapidly rotating scrubbing fluid curtain of discrete jets in a direction opposed thereto so as to scrub said gas with said scrubbing fluid, said gas redirection means including a plurality of fixed vanes located adjacent to said periphery of said rotatable impeller means and positioned so as to redirect said gas into said direction opposed to the direction of flow of said rapidly rotating scrubbing fluid curtain.

74. A method for scrubbing a gas with a scrubbing fluid which comprises supplying said scrubbing fluid to a location adjacent to the axis of rotation of rotatable scrubbing fluid impeller means including an annular scrubbing fluid distribution surface so as to project said scrubbing fluid radially outward upon the rapid rotation of said rotatable scrubbing fluid impeller means, forming a substantially continuous sheet of said scrubbing fluid adjacent to said axis of rotation and for substantially the entire surface of said annular scrubbing fluid distribution surface, forming said substantially continuous sheet of said scrubbing fluid into a plurality of discrete scrubbing fluid jets at said outer periphery of said annular scrubbing fluid distribution surface so as to form a rapidly rotating scrubbing fluid curtain of discrete jets at the outer periphery of said annular scrubbing fluid distribution surface upon the rapid rotation of said rotatable scrubbing fluid impeller means, and passing said gas to be scrubbed through said rapidly rotating scrubbing fluid curtain in a direction opposite thereto so as to scrub said gas with said scrubbing fluid.

75. The method of claim 74 wherein said location adjacent to said axis of rotation is axially displaced below said annular scrubbing fluid distribution surface so that said scrubbing fluid must pass axially upward onto said annular scrubbing fluid distribution surface as it is projected radially outward from said location adjacent to said axis rotation.

76. The method of claim 74 including supplying said gas to be scrubbed to a location adjacent to the axis of rotation of said rotatable gas impeller means, said axis of rotation of said rotatable gas impeller means being common to said axis of rotation of said rotatable scrubbing fluid impeller means, and projecting said gas radially outward upon the rapid rotation of said rotatable gas impeller means.

77. The method of claim 76 including altering the direction of flow of said gas as it flows radially outward from said rotatable gas impeller means in a manner so as to substantially reduce the rotational component of said flow of gas as it is projected radially outward by said rotatable gas impeller means, and to act as a diffuser for said gas.

78. A method for scrubbing a gas with a scrubbing fluid which comprises supplying said scrubbing fluid to a location adjacent to the axis of rotation of rotatable scrubbing fluid impeller means including an annular scrubbing fluid distribution surface so as to project said scrubbing fluid radially outward upon the rapid rotation of said rotatable scrubbing fluid impeller means, forming a substantially continuous sheet of said scrubbing fluid adjacent to said axis of rotation on said annular scrubbing fluid distribution surface, forming said substantially continuous sheet of said scrubbing fluid into a plurality of discrete scrubbing fluid jets so as to form a rapidly rotating scrubbing fluid curtain of discrete jets at the outer periphery of said annular scrubbing fluid distribution surface upon the rapid rotation of said rotatable scrubbing fluid impeller means, supplying said gas to be scrubbed to a location adjacent to the axis of rotation of said rotatable gas impeller means, said axis of rotation of said rotatable gas impeller means being common to said axis of rotation of said rotatable scrubbing fluid impeller means, projecting said gas radially outwardly upon the rapid rotation of said rotatable gas impeller means, altering the direction of flow of said gas as it flows radially outwardly from said rotatable gas impeller means in a manner so as to substantially reduce the rotational component of said flow of gas as it is projected radially outwardly by said rotatable gas impeller means, and to act as a diffuser for said gas, and passing said gas to be scrubbed through said rapidly rotating scrubbing fluid curtain in a direction opposite thereto so as to scrub said gas with said scrubbing fluid.

* * * * *